(12) United States Patent
Baychar

(10) Patent No.: US 8,569,190 B2
(45) Date of Patent: *Oct. 29, 2013

(54) WATERPROOF/BREATHABLE MOISTURE TRANSFER LINER FOR SNOWBOARD BOOTS, ALPINE BOOTS, HIKING BOOTS AND THE LIKE

(75) Inventor: Baychar, Carrabassett, ME (US)

(73) Assignee: Solid Water Holdings, Eastport, ME (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/364,072

(22) Filed: Feb. 1, 2012

(65) Prior Publication Data

US 2012/0171415 A1   Jul. 5, 2012

Related U.S. Application Data

(63) Continuation of application No. 12/910,569, filed on Oct. 22, 2010, now abandoned, which is a continuation of application No. 12/511,857, filed on Jul. 29, 2009, now abandoned, which is a continuation of application No. 12/000,589, filed on Dec. 14, 2007, now abandoned, which is a continuation of application No. 11/592,215, filed on Nov. 3, 2006, now abandoned, which is a continuation of application No. 10/626,523, filed on Jul. 25, 2003, now abandoned, which is a continuation of application No. 09/500,535, filed on Feb. 9, 2000, now abandoned, which is a continuation of application No. 08/910,116, filed on Aug. 13, 1997, now Pat. No. 6,048,810, which is a continuation-in-part of application No. 08/832,800, filed on Apr. 4, 1997, now abandoned, which is a continuation-in-part of application No. 08/747,340, filed on Nov. 12, 1996, now Pat. No. 5,738,937.

(51) Int. Cl.
B32B 27/04 (2006.01)
B32B 27/12 (2006.01)
B32B 3/26 (2006.01)

(52) U.S. Cl.
USPC ........... 442/131; 442/221; 442/223; 442/224; 442/225; 442/315; 442/370; 442/372; 428/304.4; 428/311.11; 428/311.51

(58) Field of Classification Search
USPC ............ 428/304.4, 311.11, 311.51; 442/131, 442/221, 223, 224, 225, 315, 370, 372
See application file for complete search history.

(56) References Cited

U.S. PATENT DOCUMENTS 3,020,169 A   12/1956   Phillips, Jr. et al.
3,366,291 A   1/1968    Boyer, Jr.

(Continued)

FOREIGN PATENT DOCUMENTS

EP   0899090      3/1999
JP   08-302506    11/1996

OTHER PUBLICATIONS

Olympia Sports Catalog, Olympia Performance Gloves, 1993, pp. 2-8.

(Continued)

Primary Examiner — Matthew Matzek
(74) Attorney, Agent, or Firm — Mattingly & Malur, PC

(57) ABSTRACT

The waterproof/breathable moisture transfer liner for a snowboard boot includes an inner liner selected from technically advanced fabrics which are carefully selected. A series of layers are provided outside the inner liner including foam material layers, breathable membranes, a supportive mesh or a moldable foam, and an outer shell fabric. The applicability of the liner to alpine, cross country and hiking boots, along with appropriate variations for each application.

30 Claims, 12 Drawing Sheets

(56) References Cited

U.S. PATENT DOCUMENTS

| | | |
|---|---|---|
| 3,570,150 A | 3/1971 | Field |
| 3,607,593 A | 9/1971 | Semenzato |
| 3,616,170 A | 10/1971 | Closson, Jr. |
| 3,691,140 A | 9/1972 | Silver |
| 3,779,855 A | 12/1973 | Fonzi et al. |
| 3,839,138 A | 10/1974 | Kyle et al. |
| 3,961,124 A | 6/1976 | Matton |
| 4,015,347 A | 4/1977 | Morishita et al. |
| 4,050,491 A | 9/1977 | Hargrove |
| 4,166,152 A | 8/1979 | Baker et al. |
| 4,176,211 A | 11/1979 | Jackson |
| 4,192,086 A | 3/1980 | Sichak |
| 4,216,177 A | 8/1980 | Otto |
| 4,245,410 A | 1/1981 | Molitor |
| 4,287,629 A | 9/1981 | Stalteri |
| 4,338,366 A | 7/1982 | Evans et al. |
| 4,338,371 A | 7/1982 | Dawn et al. |
| 4,391,872 A | 7/1983 | Suzuki et al. |
| 4,454,191 A | 6/1984 | Blucher et al. |
| 4,482,593 A | 11/1984 | Sagel et al. |
| 4,524,529 A | 6/1985 | Schaefer |
| 4,529,641 A | 7/1985 | Holtrop |
| 4,594,283 A | 6/1986 | Ohigashi |
| 4,599,810 A | 7/1986 | Sacre |
| 4,621,013 A | 11/1986 | Holtrop et al. |
| 4,639,397 A | 1/1987 | Sato et al. |
| 4,656,760 A | 4/1987 | Tonkel et al. |
| 4,662,006 A | 5/1987 | Ross, Jr. |
| 4,666,765 A | 5/1987 | Caldwell |
| 4,674,204 A | 6/1987 | Sullivan et al. |
| 4,729,179 A | 3/1988 | Quist, Jr. |
| 4,756,958 A | 7/1988 | Bryant et al. |
| 4,805,319 A | 2/1989 | Tonkel |
| 4,816,328 A | 3/1989 | Saville et al. |
| 4,823,407 A | 4/1989 | Phillips, Jr. et al. |
| 4,845,862 A | 7/1989 | Phillips, Jr. et al. |
| 4,894,932 A | 1/1990 | Harada et al. |
| 4,909,523 A | 3/1990 | Olson |
| 4,910,886 A | 3/1990 | Sullivan et al. |
| 4,925,732 A | 5/1990 | Driskill et al. |
| 4,954,398 A | 9/1990 | Bagrodia et al. |
| 4,983,450 A | 1/1991 | Yanagihara et al. |
| 5,000,643 A | 3/1991 | Tanaka et al. |
| 5,004,643 A | 4/1991 | Caldwell |
| 5,006,057 A | 4/1991 | Bagrodia et al. |
| 5,010,596 A | 4/1991 | Brown et al. |
| 5,021,280 A | 6/1991 | Farnworth et al. |
| 5,035,943 A | 7/1991 | Kinlaw et al. |
| 5,043,209 A | 8/1991 | Boisse et al. |
| 5,073,298 A | 12/1991 | Gentle et al. |
| 5,075,343 A | 12/1991 | Blount |
| 5,092,614 A | 3/1992 | Malewicz |
| 5,098,778 A | 3/1992 | Minnick |
| 5,126,182 A | 6/1992 | Lumb et al. |
| 5,134,017 A | 7/1992 | Baldwin et al. |
| 5,154,682 A | 10/1992 | Kellerman |
| 5,169,712 A | 12/1992 | Tapp |
| 5,171,033 A | 12/1992 | Olson et al. |
| 5,209,965 A | 5/1993 | Caldwell |
| 5,216,825 A | 6/1993 | Brum |
| 5,224,356 A | 7/1993 | Colvin et al. |
| 5,253,434 A | 10/1993 | Curley, Jr. et al. |
| 5,269,862 A | 12/1993 | Nakajima et al. |
| 5,277,954 A | 1/1994 | Carpenter et al. |
| 5,290,904 A | 3/1994 | Colvin et al. |
| 5,330,208 A | 7/1994 | Charron et al. |
| 5,340,132 A | 8/1994 | Malewicz |
| 5,342,070 A | 8/1994 | Miller et al. |
| 5,364,678 A | 11/1994 | Lumb et al. |
| 5,365,677 A | 11/1994 | Dalhgren |
| 5,366,801 A | 11/1994 | Bryant et al. |
| 5,378,529 A | 1/1995 | Bourdeau |
| 5,380,020 A | 1/1995 | Arney et al. |
| 5,385,036 A | 1/1995 | Spillane et al. |
| 5,397,141 A | 3/1995 | Hoshizaki et al. |
| 5,398,948 A | 3/1995 | Mathis |
| 5,400,526 A | 3/1995 | Sessa |
| 5,415,222 A | 5/1995 | Colvin et al. |
| 5,415,924 A | 5/1995 | Herlihy, Jr. |
| 5,418,051 A | 5/1995 | Caldwell |
| 5,431,970 A | 7/1995 | Broun et al. |
| 5,437,466 A | 8/1995 | Meibock et al. |
| 5,439,733 A | 8/1995 | Paire |
| 5,452,907 A | 9/1995 | Meibock et al. |
| 5,456,393 A | 10/1995 | Mathis et al. |
| 5,458,963 A | 10/1995 | Meirowitz et al. |
| 5,499,459 A | 3/1996 | Tomaro |
| 5,499,460 A | 3/1996 | Bryant et al. |
| 5,503,413 A | 4/1996 | Belogour |
| 5,544,908 A | 8/1996 | Fezio |
| 5,549,973 A | 8/1996 | Majetich et al. |
| 5,566,395 A | 10/1996 | Nebeker |
| 5,575,090 A | 11/1996 | Condini |
| 5,637,389 A | 6/1997 | Colvin et al. |
| 5,655,226 A | 8/1997 | Williams |
| 5,677,048 A | 10/1997 | Pushaw |
| 5,682,613 A | 11/1997 | Dinatale |
| 5,727,336 A | 3/1998 | Ogden |
| 5,738,937 A | 4/1998 | Baychar |
| 5,763,335 A | 6/1998 | Hermann |
| 5,775,006 A | 7/1998 | Breuner |
| 5,783,277 A | 7/1998 | Rock et al. |
| 5,785,909 A | 7/1998 | Chang et al. |
| 5,787,502 A | 8/1998 | Middleton |
| 5,876,792 A | 3/1999 | Caldwell |
| 5,932,299 A | 8/1999 | Katoot |
| 5,970,629 A | 10/1999 | Tucker et al. |
| 6,004,662 A | 12/1999 | Buckley |
| 6,018,819 A | 2/2000 | King |
| 6,048,810 A | 4/2000 | Baychar |
| 6,065,227 A | 5/2000 | Chen |
| 6,074,966 A | 6/2000 | Zlatkus |
| 6,200,915 B1 | 3/2001 | Adams |
| 6,237,251 B1 | 5/2001 | Litchfield et al. |
| 6,474,001 B1 | 11/2002 | Chen |
| 6,474,002 B2 | 11/2002 | Chen |
| 6,479,009 B1 | 11/2002 | Zlatkus |
| 6,602,811 B1 | 8/2003 | Rock et al. |
| 6,604,302 B2 | 8/2003 | Polegato Moretti |
| 6,607,994 B2 | 8/2003 | Soane et al. |
| 6,660,667 B2 | 12/2003 | Zuckerman et al. |
| 6,770,580 B2 | 8/2004 | Bevans |
| 6,893,695 B2 | 5/2005 | Baychar |
| 7,125,816 B1 | 10/2006 | Baychar |
| 2001/0008672 A1 | 7/2001 | Norvell et al. |
| 2001/0016992 A1 | 8/2001 | Gross |
| 2002/0012784 A1 | 1/2002 | Norton et al. |
| 2004/0058102 A1 | 3/2004 | Baychar |
| 2004/0081791 A1 | 4/2004 | Abrams |
| 2006/0124892 A1 | 6/2006 | Rolland et al. |

OTHER PUBLICATIONS

MOTOPORT—1991 MOTOPORT U.S.A. Apparel and Accessory Catalog, 1991.
KAMIK Catalog, 1997.
LaCrosse Catalog, 1997.
Frisby Technologies Test Report—"Insulated Boot Lines Containing Microencapsulated Phase Change Materials", Dec. 12, 1995.
Frisby Technologies Test Report—"Cold Weather Boot Liners Containing COMFORTEMP Foam", Sep. 24, 1996.
"Analytical Modeling of a MicroPCM-Enhanced Diver Dry Suit", U.S. Naval Academy, Technical Report EW-20-96, Aug. 1996.
Soccer Technology Catalog, PUMA, 1992.
Outlast Style #1750 (Alpine 1), Product Specification, 1996.
OUTLAST Style #4330 (Alpine 2), Product Specification, 1996.
OUTLAST Alpine TRF3, Product Information Sheet, 1996.
Frisby Technology Documents, No. F001006-F001009, Jun. 1996.
Rodriguez, Ferdinand, "Principles of Polymer Systems", 1982, Hemisphere Publishing Corp., $2^{nd}$ Ed., p. 362.
Maney, Kevin, "Nanotech Advances Nanew Fabric", USA Today, published Jan. 10, 2004.

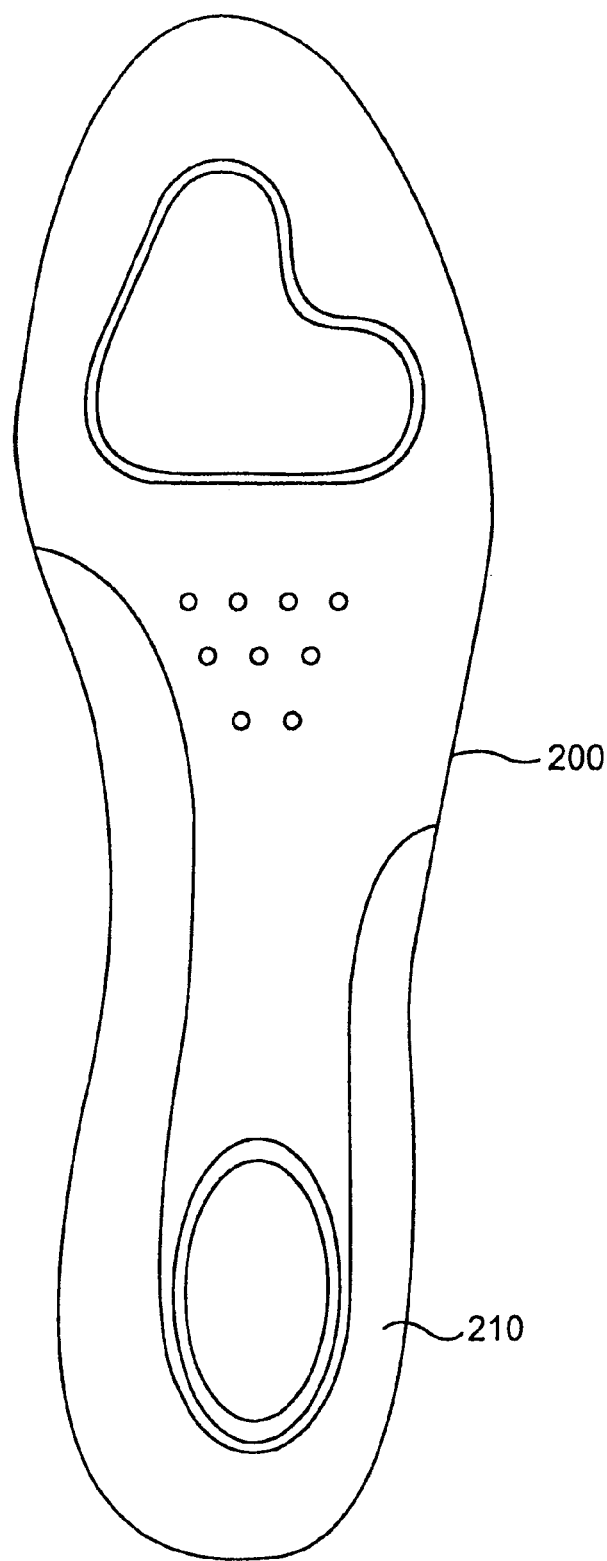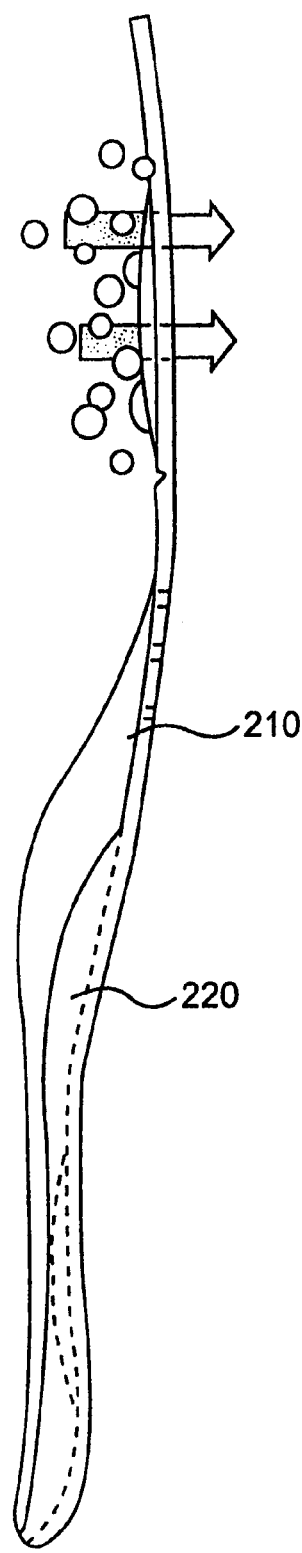
FIG. 5(a)  FIG. 5(b)

WATERPROOF/BREATHABLE MOISTURE TRANSFER LINER FOR SNOWBOARD BOOTS, ALPINE BOOTS, HIKING BOOTS AND THE LIKE

CROSS-REFERENCES

This is a continuation application of U.S. Ser. No. 12/910,569, filed Oct. 22, 2010, which is a continuation application of U.S. Ser. No. 12/511,857, filed Jul. 29, 2009 now abandoned, which is a continuation application of U.S. Ser. No. 12/000,589, filed Dec. 14, 2007, now abandoned, which is a continuation application of U.S. Ser. No. 11/592,215, filed Nov. 3, 2006, now abandoned, which is continuation application of U.S. Ser. No. 10/626,523, filed Jul. 25, 2003, now abandoned, which is a continuation application of U.S. Ser. No. 09/500,535, filed Feb. 9, 2000, now abandoned, which is a continuation application of U.S. Ser. No. 08/910,116, filed Aug. 13, 1997, now U.S. Pat. No. 6,048,810, which is a continuation-in-part application of U.S. Ser. No. 08/832,800, filed Apr. 4, 1997, now abandoned, which is a continuation-in-part application of U.S. Ser. No. 08/747,340, filed Nov. 12, 1996, now U.S. Pat. No. 5,738,937.

FIELD OF THE INVENTION

The present invention relates to liners used in a variety of applications. For example, the liner of the present invention may be employed in a variety of applications including snowboard boots, alpine boots, cross-country boots, downhill boots and even apparel such as shirts. The liner is breathable and waterproof to increase comfort for the rider.

BACKGROUND OF THE INVENTION

Various types of liners are known in the prior art. However, these liners do not provide the advantages realized by the present invention. The present inventor has recognized the problems faced by snowboard riders developed liners to overcome such problems.

There is an ongoing need for comfort, breathability and support for snowboard boot liners. In prior liner designs, a rigid, non-breathable outer material, such as vinyls, foams and nylons is often used. The inner liners have been leather, synthetic leather, nylon or polyester blends which extremely limited the ability to breathe or wick moisture away from a rider's body. These materials have prevented the foot from breathing adequately.

SUMMARY OF THE INVENTION

An object of the present invention is to provide lining system employing a warmer and more breathable liner that meets the needs of each individual snowboard rider. Accordingly, the liner of the present invention can be accommodated to the needs of snowboard riders of various skill categories by permitting the inner liner material, which is against the foot, to vary in fiber content and construction.

This object of the present invention is realized by providing a lining system having lining materials which act as a moisture transfer system. Moisture vapors are transferred through the liner from one side to the other side. The various lining materials can be attached to each other by lamination, mechanical bonding (or stitch bonding as done by Tietex, Inc. or Xymid group of Dupont) or a combination of the two. Specific examples are proved below in the description of the preferred embodiments of the present invention.

Other objects, features and advantages of the present invention will become readily apparent in view of the following detailed description of the preferred embodiments in conjunction with the drawings.

BRIEF DESCRIPTION OF THE DRAWINGS

FIGS. 5(a) and 5(b) illustrate a sole portion of a boot constructed according to a preferred embodiment of the present invention.

DETAILED DESCRIPTION OF THE PREFERRED EMBODIMENTS

The following detailed description of the preferred embodiments of the present invention is undertaken in connection with the drawings. This description, while undertaken with respect to the disclosed embodiments, is intended to enable a variety of different applications and slight modifications which form a part of the present invention as claimed. More specifically, many of the materials used in this lining system have been developed relatively recently, and in many cases are still being modified and improved. Where possible, tradenames of specific products have been used to assist in the understanding of the invention. The lining system according to the present invention can be easily adapted to accommodate further developments in these materials. For example, while the preferred embodiments are illustratively presented below as a specific sequence of layers, it should be understood that one or more of these layers may be omitted depending upon the specific needs of any application. In other words, it is not strictly necessary to have a certain number of foam layers just as that disclosed in the currently preferred embodiment. This also applies for other elements that are described. For the sake of conciseness, every possible combination contemplated by the inventor are not specifically enumerated. With this in mind, the preferred embodiments currently envisioned are set forth below.

Figure 1:
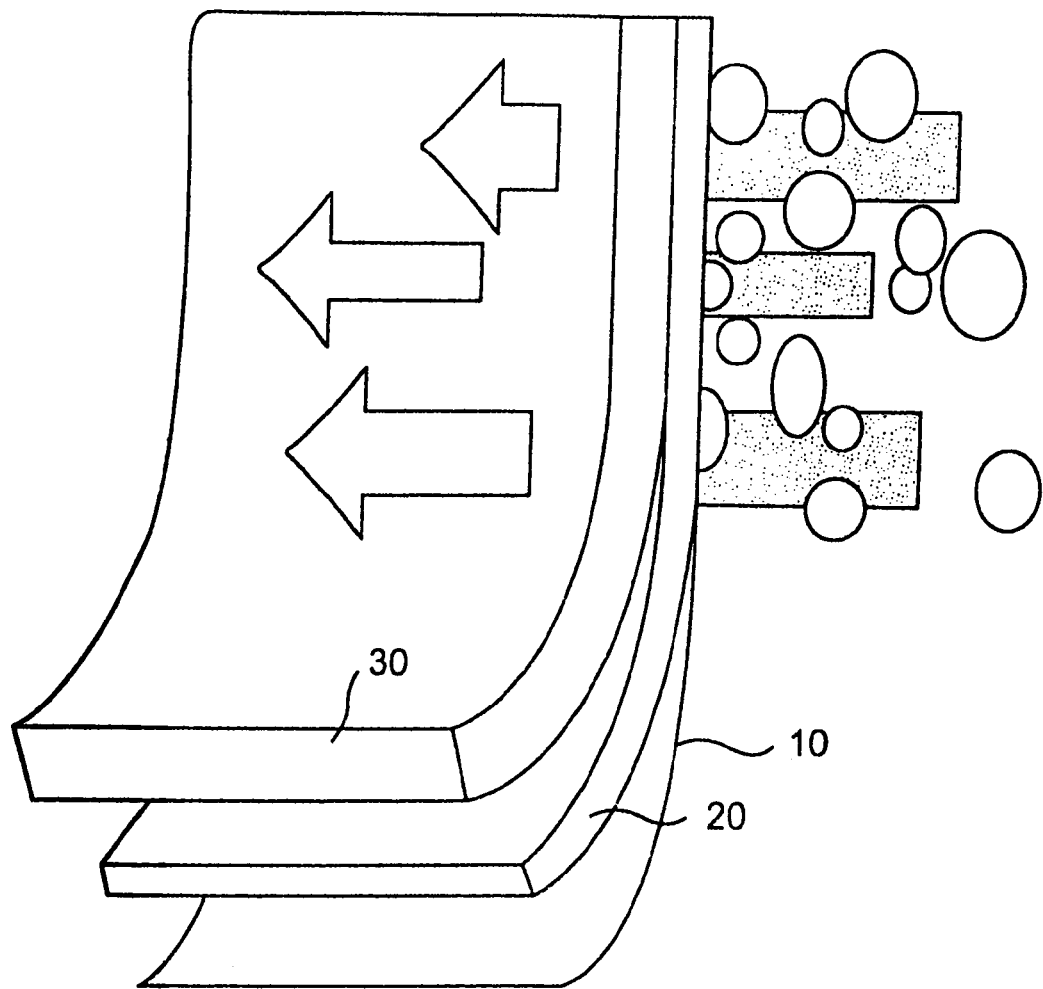
FIG. 1 illustrates a first portion of the liner according to a first embodiment of the present invention.

FIG. 1 illustrates a portion of the liner, or lining system, according to a first embodiment of the present invention. This embodiment is directed to a liner for a snowboard boot which is generally non-removable. The various layers of materials discussed below can be attached to one another is a number of ways, particularly by lamination, mechanical bonding (or stitch bonding such as that done by Tietex, Inc. or Xymed Group by Dupont) or a combination of lamination and mechanical bonding. Mechanical bonding can be performed using nylon or LYCRA® thread, or the like. As shown in FIG. 1, a first foam material 20 is provided between an inner liner 10 and a second foam material 30. The inner liner 10 can be attached to the first foam material 20 by lamination or the like. The second foam material 30 is a germicidal and reticulated foam and has a thickness of approximately ¼ inch. The first foam material is also preferably germicidal and reticulated and has a thickness of approximately ⅛ inch. All of the foam materials used in the present invention are assumed to be breathable and their thicknesses can be varied depending upon specific needs. Alternatively, some of the foam materials can be replaced with a germicidal, hydrofilic open-cell foam. For example, a foam called AQUAZONE (made by Foamex) may be used. Preferably, the AQUAZONE is attached to a non-woven top sheet made of wood pulp, polyester, cotton, rayon, polypropylene, LYCRA® or a combination of these, etc..

The inner liner 10 is preferably constructed using specific fabrics possessing certain desired characteristics. A list of fabrics which can be employed depending upon the individual needs of their application as well as the individual needs of each rider are provided below. These fabrics may either be used individually or in combination and can be double sided with one fiber on one side and another on the other side. Variations for use in a snowboard boot are specifically recited.

The first fabric is an antimicrobial, antifungal polypropylene (also referred to as polyolefin) LYCRA® blend (2%) with INNOVA fiber, or the like. INNOVA is a continuous filament fiber (manufactured by Deercreek Fabrics, Inc. or Menra Mills).

The second fabric is an antimicrobial, antifungal polypropylene having a polyester or cotton backing, or the like (such as that manufactured by Coville, Inc.). For uses such as for alpine boots, the polyester or cotton backing can be replaced with wool or silk.

The third fabric is an antimicrobial, antifungal polypropylene/cotton blend with ALPHA fiber (such as that manufactured by Intex Fabric, Inc.).

The fourth fabric is a field sensor polyester with waffle weave construction (such as that manufactured by Toray and distributed by Yagi & Co., Inc.). Alternatively, a polyester material known as AQUA-DRY, manufactured by Teijin Shojin can be employed.

The fifth fabric is a hydrofilic antimicrobial DRI-LEX DRI-LEX BABY KID or perforated material (such as that manufactured by Faytex Corp.).

The sixth fabric is a polyester looped terry (such as that manufactured by Kronfli Spundale Mills, Inc.).

The seventh fabric is a sueded/sanded polyester microfiber material (distributed by Yagi & Co., Inc. and Teijin Shojin, Inc.).

The eighth fabric is POLAR TEC Series 2000, which is a wickable, moisture transfer fiber, containing LYCRA® and polypropylene. This fabric is also antimicrobial.

The ninth fabric is a moisture transfer fabric by Tietex, Inc.

The tenth fabric is a wool blend with a cotton, polyester or the like backing.

Finally, spacer fabrics, polyester or polyester blends manufactured by Malden Mills and others can be used. These are composite fabrics having layers of fabrics.

All of these fabrics have good moisture transfer characteristics which prevent damage to a rider's foot by preventing excessive moisture built-up.

The moisture transfer characteristics of the inner liner 10 causes moisture vapors to be passed from a rider's body through the inner liner 10 where it then comes into contact with the first foam material 20. The moisture vapors travel through the first foam material 20 and come into contact with the abutting second foam material 30.

First foam material 20 may be a cellular elastomeric composite, or the like, having a layer of ⅛" germicidal, reticulated foam (or germicidal, hydrophilic open-cell foam such as AQUAZONE, or the like) backed with a nonwoven top sheet comprised of wood pulp, rayon, cotton, polypropylene, polyester, LYCRA®, or a combination thereof. The cellular elastormeric composite is formed in one process. Alternatively, foam material 20 can be a foam that is separate from the nonwoven top sheet and is attached to the nonwoven top sheet by lamination, stitched or ultrasonically bonded. The nonwoven top sheet (when used) abuts the next layer of ¼" reticulated/hydroflic open cell foam, or second foam material 30, The second foam material 30 may also be a germicidal, hydrophilic, open-cell ¼" foam, such as AQUAZONE, or the like. The second foam material is preferably backed with a nonwoven top sheet as mentioned above. In fact, any of the foam materials discussed herein can be backed by such a nonwoven top sheet. Also, many of the foam materials are interchangeable depending upon specific needs. Alternatively, the foam materials can be flame laminated to a non woven apertured top sheet of cotton, polypropylene or polyester, or a blend thereof, for example.

For example, the first foam layer 20 may also be substituted with a germicidal, hydrofilic open-cell, ⅛" foam, such as AQUAZONE. The foam can also be backed by non-woven top sheet. Also, a temperature regulating membrane called OUTLAST, by Gateway Technologies can be inserted between inner layer 10 and the first foam material 20 or applied to the fibers of layer 10.

Alternatively, Frisby Technologies can be embedded in the first open cell, hydrofilic foam layer 20 or placed in the second foam material 30. The hydrofilic foam is preferably AQUAZONE, but may be a Frisby product called COMFORTEMP.

The OUTLAST membrane can be placed on the other side foam, outside the nonwoven top sheet, if present. In fact, OUTLAST or Frisby may be combined with any foam or insulative layer and can be on either side.

A number of patents have been issued to Triangle Research & Development Corp. disclosing details related to the processes now being employed by Gateway Technologies and Frisby. For example, U.S. Pat. Nos. 4,756,958 and 5,366,801 are directed to fibers and fabrics with reversible enhanced thermal properties, respectively. The disclosures of these two patents are hereby incorporated by reference. Other patents assigned to Triangle Research & Development Corp., that are related by subject matter and have overlapping inventorship, include U.S. Pat. Nos. 5,415,22, 5,290,904, and 5,244,356. These patents are also hereby incorporated by reference.

Another patent, U.S. Pat. No. 5,499,460, which has overlapping inventorship with the above-mentioned patents, is directed to a moldable foam insole with reversible enhanced thermal storage properties. The disclosure of this patent is hereby incorporated by reference, and is illustrative of one type of moldable foam that can be used as mentioned herein.

Figure 2:
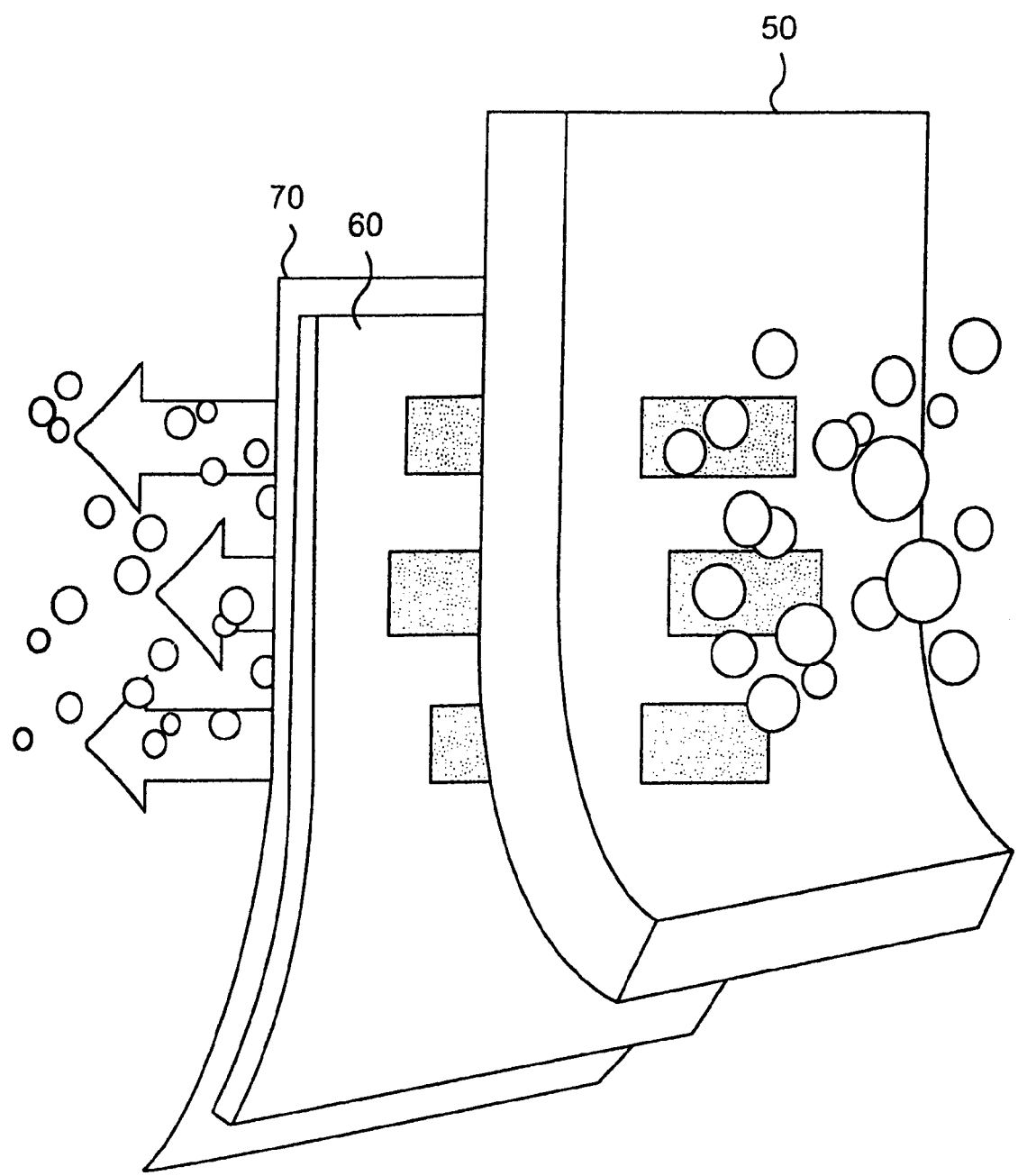
FIG. 2 illustrates a second portion of the liner according to a first embodiment of the present invention.

As shown in FIG. 2, a third foam material 50, which provides support and has similar characteristics to the second foam material 30, allows the moisture vapors to continue their movement toward the outside. This third foam material 50 is formed in certain areas to take necessary shapes such as the shape of an ankle, heel cup and foot bones and is positioned so as to allow the moisture to pass through into subsequent elements, such as waterproof/breathable membrane 60 and the outer layer 70 of the overall lining system. The third foam material 50 may alternatively be a spacer fabric by Muller or the like. The spacer fabric or the third reticulated/open cell foam material 50 can be designed to provide a well defined heel lift, and heel pocket. This invention develops the components necessary to increase technical performance with the increased support around the heel, toe and ankle. The toe box is from top to bottom, wider and more flexible than in previous boot liners. The laminated foams under the heel support the riders lower back and allows for a comfortable stride. With this added comfort, the aggressive or recreational snowboard rider can achieve a higher level of continued performance.

Figure 3:
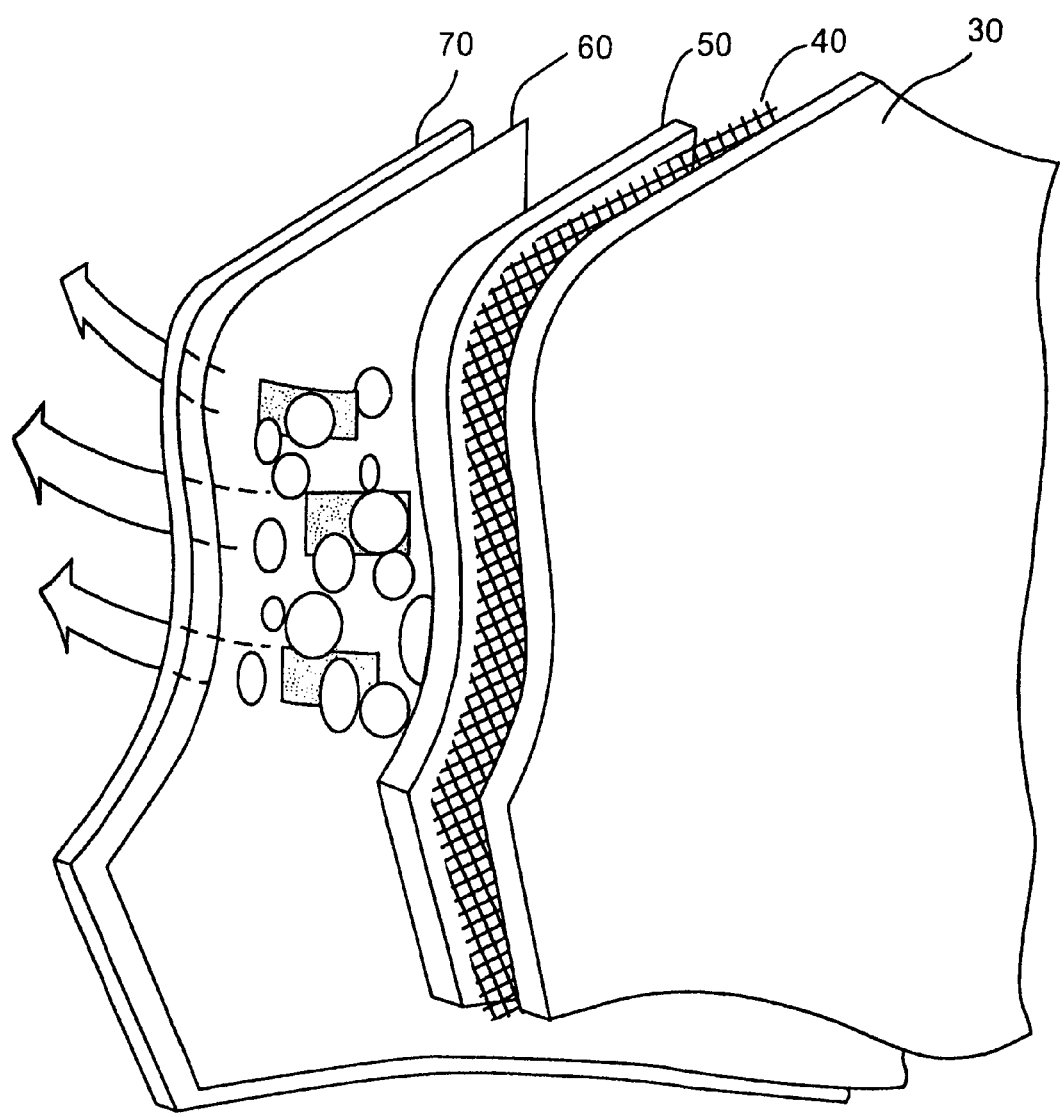
FIG. 3 illustrates an example of the liner according to the first embodiment of the present invention.

As shown in FIG. 3, between the supporting second foam material 30 and the third foam material 50 is a structural mesh 40 which can be a flex guard, for example such as one manufactured by NALTEX or Conwed or the like, that adds structural integrity to the lining system. A spacer fabric, moldable foam, or the like, may also be used in place of this flex guard or mesh. Also, neither may be used is some circumstances. The moldable foam, if not very breathable, can be made breathable by puncturing. Alternatively, the moldable foam can be a reticulated or hydrofilic, open-cell structure, or the like. A non-woven top-sheet (with or without apertures) can be attached to the moldable foam. If a moldable foam is used, then the second foam material may be omitted. Also, the moldable foam can be AQUAZONE. Preferably, for snowboard applications the moldable foam or spacer fabrics are used instead of the flexible mesh as layer 40.

As mentioned earlier, the third foam material 50 is preferably similar in construction to the second foam material, namely being either germicidal, reticulated and approximately ¼ inch thick or being germicidal, hydrofilic, open-cell (for example, AQUAZONE). This material is preferably laminated to a non-woven top sheet (which may or may not be apertured) comprised of wood pulp, rayon, or cotton. The top sheet abuts the waterproof/breathable membrane 60.

For snowboard boots, due to the cold weather conditions, a combination of thermolite (or thermoloft) and foam or thermolite by itself is preferably used for third foam material 50. Thermolite, manufactured by Dupont, is a thin insulation having a hollow polyester fiber laid in random layers with an acrylic binder (loose felted) needle punched through the cross section to attach layers and tie them down. Various types of thermolite can be used, such as thermolite extreme, thermoloft, microloft, TFI 2000 G/M2 or TFI 4000 G/M2, etc. If encapsulation is used in outer layer 70, as discussed herein, then it is important to use thermolite as layer 50. Again, the OUTLAST membrane or Frisby can be used in combination with third foam material 50, especially in combination with thermolite.

Figure 4:
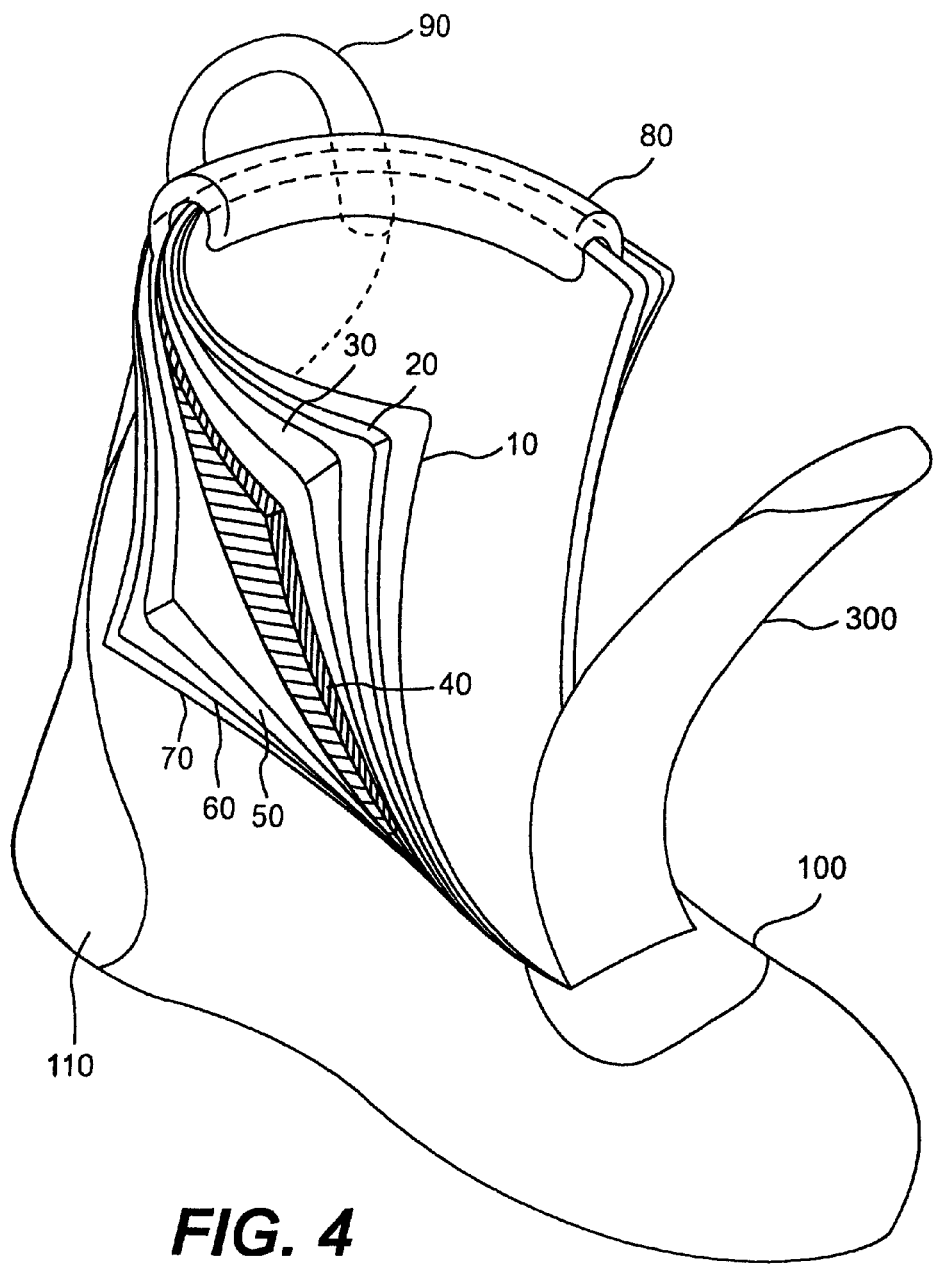
FIG. 4 illustrates the liner shown in FIG. 3 which will form a part of a snowboard boot.

The moisture vapor continues from the second foam material 30 through the mesh or spacer material 40 and on through the third exterior foam or Thermolite material 50. The moisture vapors are then passed through waterproof/breathable membrane 60. The moisture vapors are absorbed into the waterproof/breathable membrane and passed through to an outer layer of fabric 70, as shown in FIG. 4. The waterproof/breathable membrane 60 can be selected from a variety presently available on the market. Those under the tradenames VAPEX 2000/PLUS/STANDARD/1300, SECO-TEC, THINTEC, LAY-TEK and Witcoflex Super Dry film by Baxenden Chemicals (a hydrofilic membrane) are currently being considered. However, the membranes currently considered to be the preferred ones are called TX-1540 (application by Shawmut Mills). TX-1540 is intended to be an ultra-thin, skin friendly, moisture barrier that allows moisture vapors to escape while preventing outside water from penetrating. The OUTLAST membrane or the Frisby Technologies can be used in combination with other membranes, with encapsulation techniques, or with structurally knitted fabrics and can adjust to temperature changes. Of the various encapsulation techniques, the one practiced by Nextec is particularly advantageous.

Also shown in FIG. 4 is an optional protective rim or cuff 80, preferably made of a slow recovery foam (by Foamex, for example) or neoprene covered by LYCRA®. Cuff 80 could also be made of a reticulated foam. A pull tab 90, preferably made of nylon, is connected to the protective rim 80. An abrasive protective material 100 is provided adjacent to a tongue 300. Another abrasive protective material 110 is provided around the heel portion of the boot. Abrasive protective material 110 is supplied by Schoeller or Dupont, or the like.

The outer layer of fabric 70 of the lining system has 200 to 6000 denier strength and is made waterproof by a membrane, encapsulation technology or by using structurally knitted, water repelling fabrics. Encapsulation technology is being utilized by a company called Nextec, Inc. or Toray, Inc. (a Japanese Company or the like). Nextec Technology can be combined with the OUTLAST membrane or Frisby Technology. The OUTLAST membrane may be coated or laminated to the outer fabric. If the outer fabric is encapsulated then the OUTLAST technology must be applied to the fiber or fabric prior to encapsulation. The Frisby temperature regulating molecules can be incorporated into the spaces between the encapsulated fibers and may be inserted at the time of encapsulation. The breathable membranes preserve the outer layer of fabric 70 and perform as a waterproof barrier for the boot liners. If the encapsulation technology is applied to the outer layer of fabric 70, then the breathable laminate membranes need not be used.

The outer layer 70 may be any of the following materials, either individually or in combination. These materials include synthetic breathable leathers, or the like, by Daowoo, Kevlar and Cordura fabrics, by Schoeller, Kevlar and technical fabrics by Dupont and Toray, Cordura treated by Encapsulation by Dupont, Travis and the like, 4 ply supplex, Cordura waterproofed by the breathable membrane, F.L. fabric by Malden Mills, DERMIZAX by Toray, ENTRANT GIL and WAXEY by Toray, GYMSTAR PLUS and TUFLEX-HR both by Unitika. The Corduras can be those made by others as well. There are primarily three ways of protecting outer layer 70, encapsulation, using a membrane, structurally knitting the fabric to repel water or coating the fabrics with a waterproof film. Preferably, the outer layer 70 is a combination of one of the above-mentioned materials with one of the following: the OUTLAST or Frisby Technologies and encapsulation by Nextec or the like, or the OUTLAST membrane or Frisby Technologies and the waterproof/breathable fabrics such as ENTRANT GIL, DERMIZAX, TUFLEX or GYMSTAR. The OUTLAST membrane is laminated or coated to the outer fabric's fibers, or the Frisby Technology embedded in the outer fabric and then laminated to the waterproof/breathable membrane, the Frisby or OUTLAST Technologies in combination with structurally knitted or woven waterproofed fabrics, or finally the Frisby or OUTLAST Technologies in combination with ENTRANT GIL, Dermaizax, Turflex or GYMSTAR or the like. The outer fabrics in several performance categories may not apply either Frisby or OUTLAST Technologies.

Selecting the proper materials depends upon the needs of each individual snowboard rider. The non-abrasive fabrics used in the moisture transfer inner liner of the present invention greatly reduces the possibility of trapped moisture, thereby protecting the foot from fungus growth and any damage. The antifungal, antimicrobial polypropylene (polyolefin) fabrics quickly remove moisture away from the foot. Skin damage is minimized because the polypropylene fabric has a smooth, continuous surface. This fabric also prevents bacterial build-up which can cause foot odor and fungus.

The polyester looped terry blend is an excellent wicking fabric and can remove moisture rapidly when treated with a wetting agent.

The antifungal, antimicrobial, DRI-LEX nylon fabrics, like the polypropylene, is sanded and soft. The material not only removes moisture from the foot, but also is extremely comfortable and cool to the touch.

The polyester field sensor fabric works well with those individuals who prefer riding free-style. This liner absorbs moisture immediately.

A polyester microfiber fabric is smooth to touch and wickable. A wetting agent may be added to assist in moisture transfer.

Finally, a wool blend backed with polyester or cotton or the like.

As a result of using this lining system, the rider continues to have a cooler, drier foot. The lightweight kevlar, starlite, Cordura and DERMIZAX outer liner materials are twice as durable as the former heavyweight nylons and synthetic leathers often used on the outer shell, but function as a softer, stronger feeling breathable outer surface and aid in the moisture transfer.

FIGS. 5(a) and 5(b) illustrate a sole portion 200 of a foot foam pad covered with cambrelle DRI-LEX nylon. Preferably, however, the foot pad is designed using Sontara Technology nonwoven, by Dupont, and called ComforMaxSPORT, or the like. ComforMaxSPORT is backed by hydrophilic foam and helps protect the foot bed from damage due to friction. The inserted hydrophilic foam foot pad adds support and transfers moisture downward. The bottom portion of the foam is preferably provided with a nonwoven top sheet as described earlier. The heel pocket foam protects the back of the heel with a double layered reticulated support foam. This cushion protector allows circulation in the heel. ComforMaxSPORT or an antimicrobial cambrelle DRI-LEX nylon 210, or the like, covers a molded hydrophilic foam or a slow recovery foam 220 that supports the arch and insures additional comfort for a rider.

Figure 6:
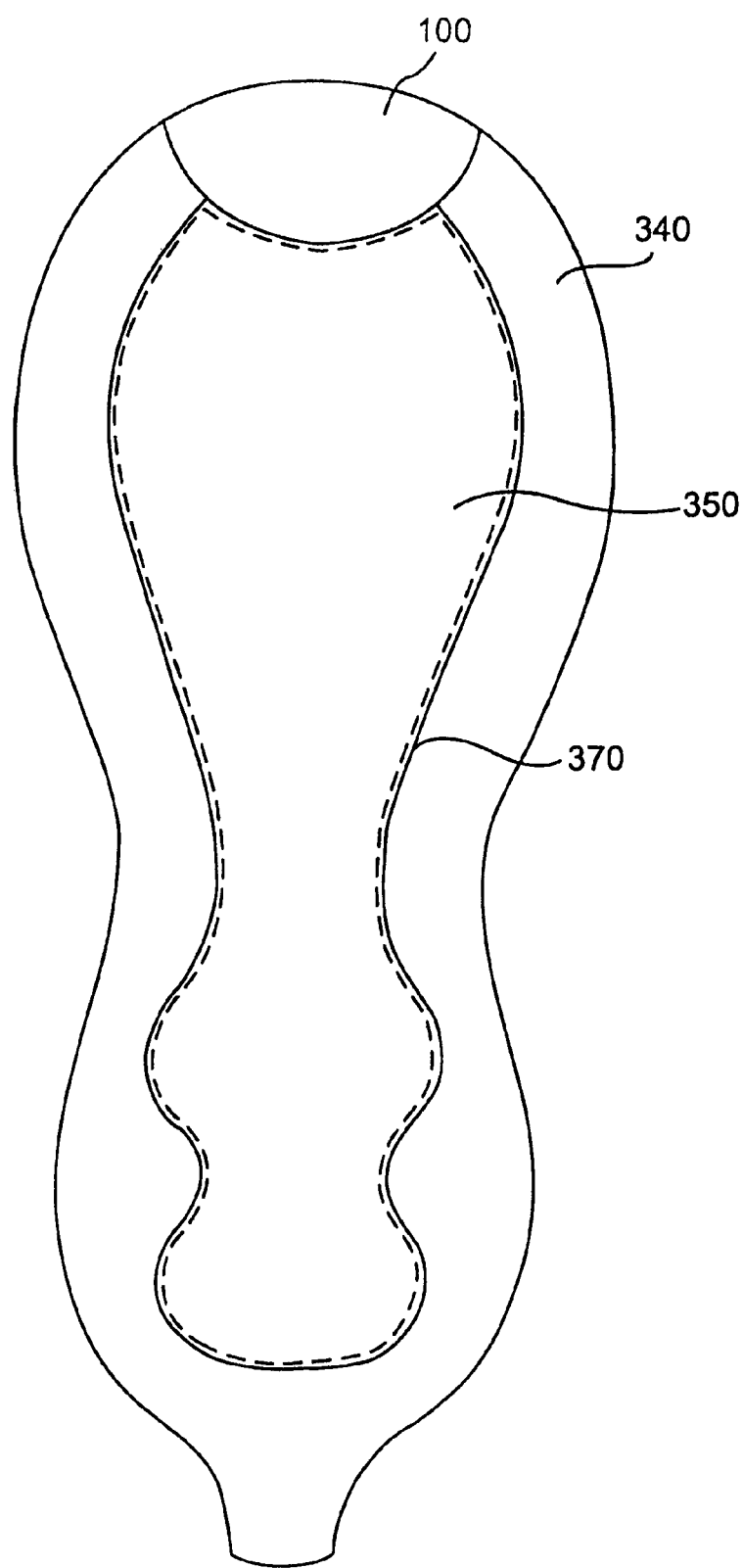
FIGS. 6 and 7 illustrate a tongue portion of a boot constructed according to a first embodiment of the present invention.
Figure 7:
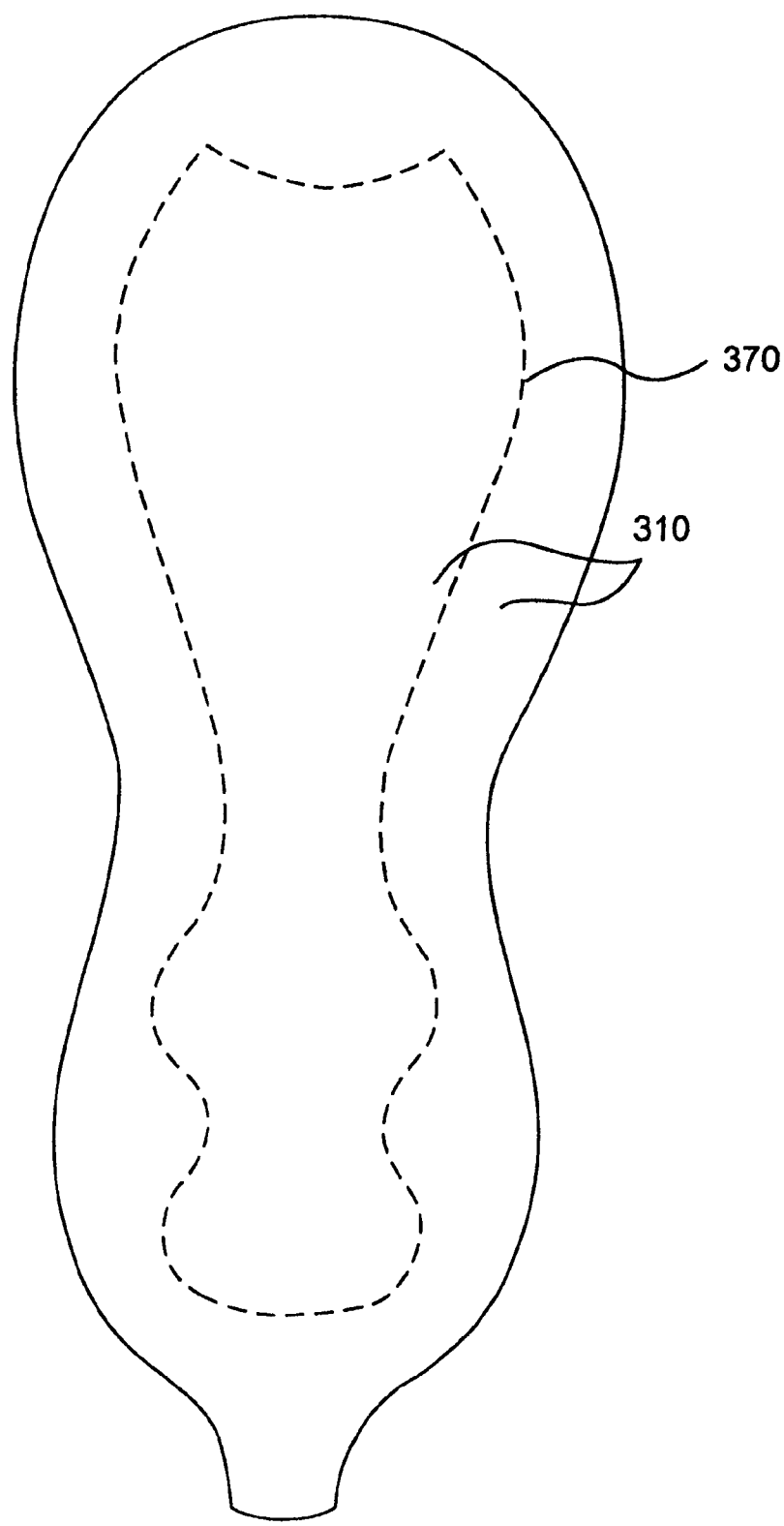
Figure 8:
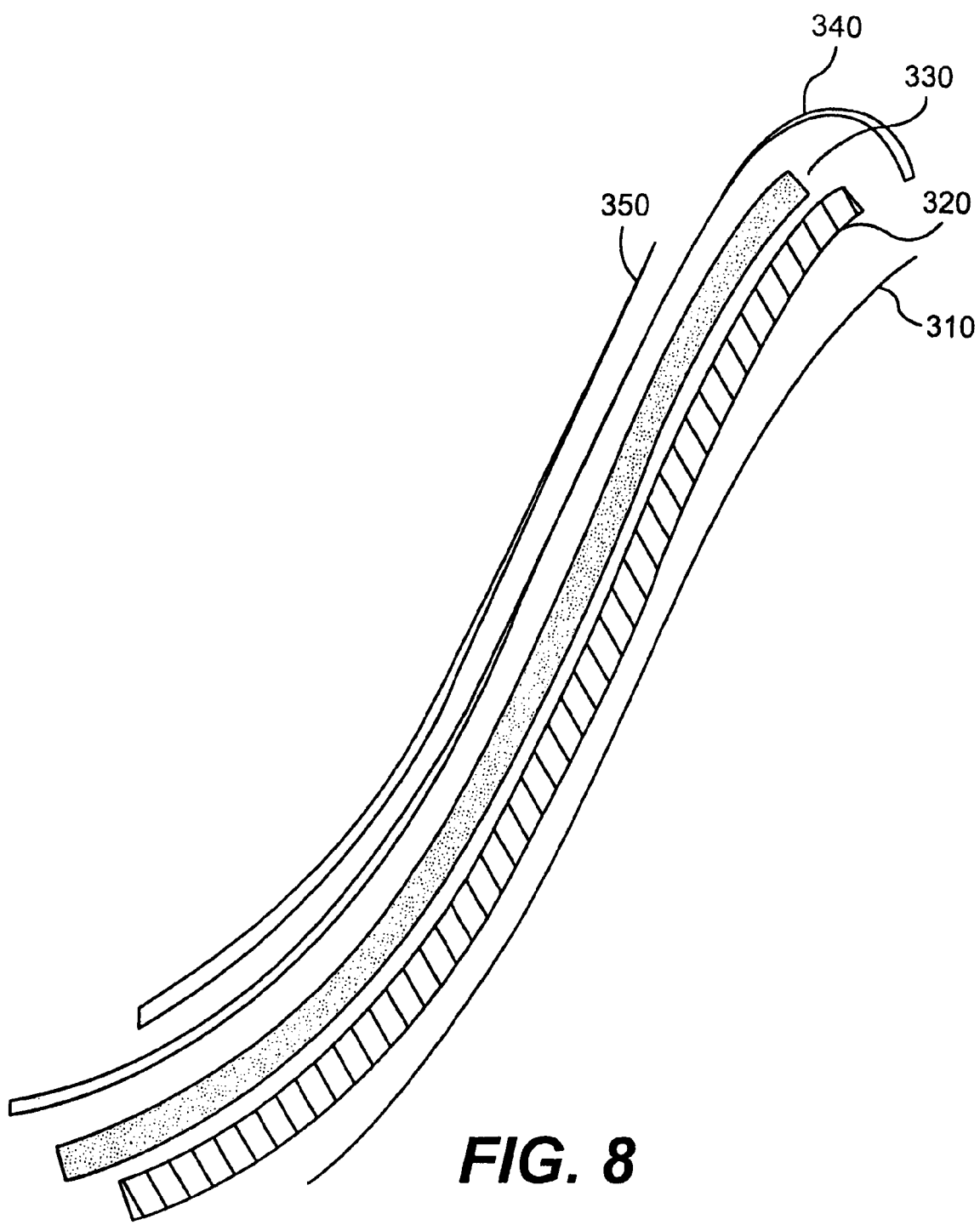
FIG. 8 illustrates a more detailed view of the liner portion used for the tongue of FIGS. 6 and 7.

FIGS. 6, 7 and 8 illustrate the tongue 300 of the boot in more detail. The tongue is designed to add further comfort and support. As shown in FIG. 8, an inner liner fabric 310 of the tongue 300 is preferably one of the other inner liner materials mentioned above, especially the polypropylene LYCRA® blend with INNOVA fiber, the polyester microfiber, the polyester looped terry or the fabrics by Malden Mills, Miliken or the like. This inner liner fabric 310 is preferably laminated to a structural support foam 320, which is preferably a ¼ inch germicidal, reticulated foam. A hydrophilic perforated foam 330 (also could be a reticulated foam, or PORON which is a slow recovery foam by Rogers, Inc., or the like) abuts a structural support foam 320. The hydrophilic perforated foam 330 can take the shape of the foot bones and protect the upper foot from damage. The structural support 320 can also be shaped to accommodate the foot and protect the ankle bones. Optionally, a moldable spacer fabric by Muller, or the like, may also be used as portion 330. A moisture transfer material 340 lies over the hydrophilic perforated foam 330. This moisture transfer material 340 is preferably made from a material known as aero-spacer DRI-LEXDRI-LEX, which is manufactured by Faytex Corp, or an aero-spacer fabric manufactured by Apex Mills, or the like. Optionally, a nonwoven material such as Sontara Technology manufactured by Dupont can be used. In one embodiment, neither the aero-spacer or the nonwoven by Sontara Technology is used.

The nonwoven material, Sontara Technology, can be a spun lace moisture management product called Typar, for example. It can have a sanded surface treatment or it can look like steel wool and would wrap around the edges of the tongue. It should be understood that these nonwoven materials can always be substituted for the aero-spacer DRI-LEX, even if not specifically mentioned in other parts of this disclosure. This material 340, is wrapped around the outer edge of the tongue to allow moisture vapors traveling from the upper foot area to escape through moisture transfer material 340 to the outer surface of the tongue 300. Material 340 also aids in providing a softer edged tongue. Finally, an outer layer 350 is provided over a central portion of the material 340. Another hydrophilic, molded foam (not shown), or slow recovery form or hydrofilic foam, is shaped to fit between the outer layer 350 and material 340.

As shown in FIG. 6, outer layer 350, which can be a breathable synthetic leather (by Daewoo Corp. for example) or a kevlar, or the like is surrounded by aero-spacer DRI-LEX 340, a substitute as mentioned above or a combination thereof. At the top of the tongue 300 is an abrasive reflective grip fabric 100 (such as that manufactured by Schoeller and identified by the number 6500, or the like), also shown in FIG. 4. Stitching is identified by numeral 370. FIG. 7 illustrates a top portion of the tongue 300, and shows stitching 370 and the inner liner fabric 310.

Figure 9:
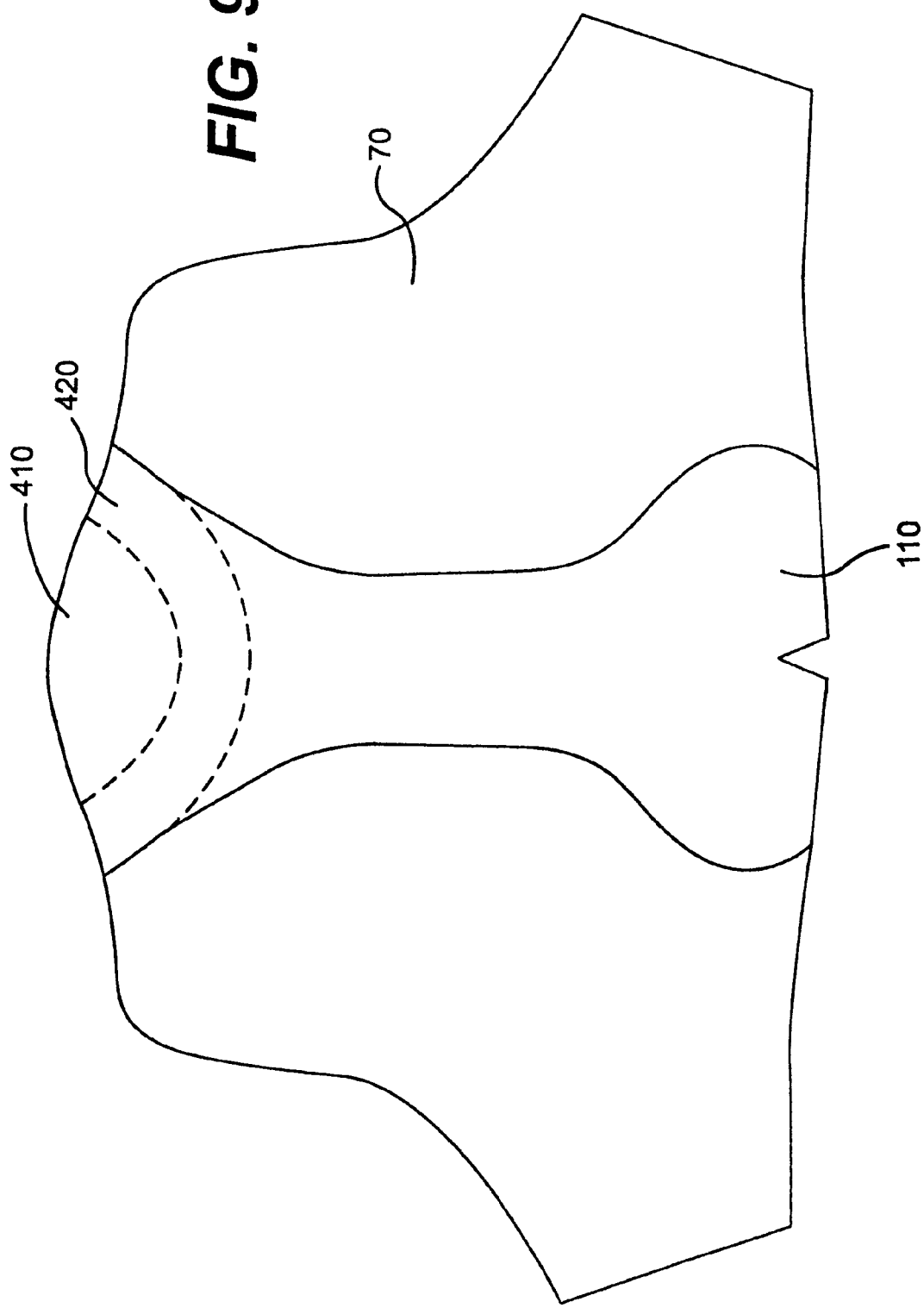
FIG. 9 illustrates a portion of the liner used in the upper cuff area.
Figure 10:
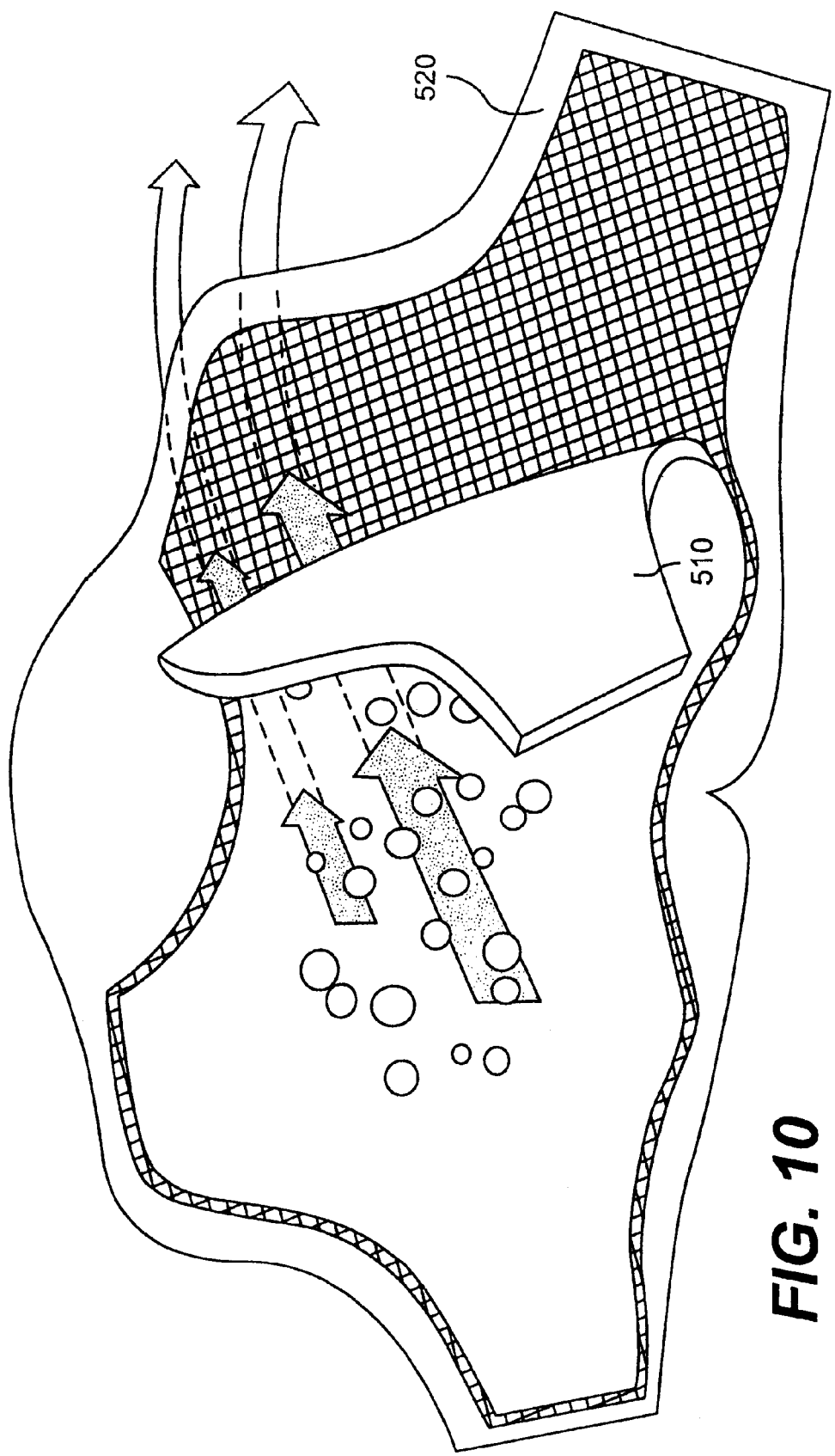
FIG. 10 illustrates the travel of moisture through a reticulated foam then a flexible mesh and into and through a breathable membrane according to the first embodiment of the present invention.

The liners are preferably provided with a pull tab 90 as illustrated in FIGS. 4, 9 and 10 on the back of a cuff 80 constructed of a slow recovery foam (by Rogers, or the like) or neoprene covered by LYCRA®. Optionally, cuff 80 can be omitted altogether. FIG. 9 shows an opened up version of the liner looking from the back of the boot. Located just beneath the LYCRA® covered neoprene cuff 80 is a abrasive grip fabric material 410, such as that manufactured by Schoeller, Inc. and referred to by the number 6500. Below material 410 is a reflective grip composite material 420. Below the reflective grip composite material 420 is a highly abrasive fabric 110, as shown in FIG. 4. Fabric 110 is preferable a Kevlar or Starlite or a cordura, or the like. Finally, outer shell fabric 70 is the same as that shown in FIG. 4, and can be any of the fabrics listed previously in connection with outer shell fabric 70. The nylon pull tab 90 allows the rider to easily slip into the liner.

FIG. 10 shows the other side of the liner of FIG. 9. In FIG. 10, 510 can be a ¼ inch moldable foam which has been punctured or a moldable spacer fabric or the like. 520 represents the combination of the flexible mesh and foam (in the case the moldable foam is not used as depicted), the breathable membrane and the outer shell fabric. As in all of the Figures, the arrows depict the flow of moisture.

Figure 11:
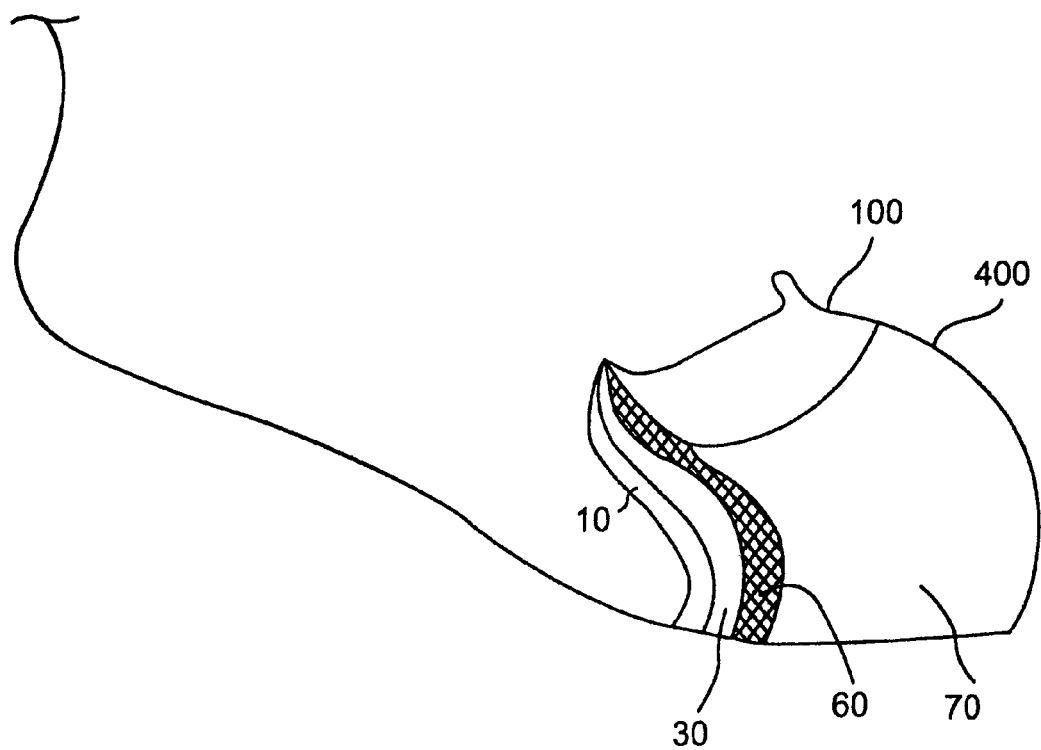
FIG. 11 illustrates the toe portion of a boot according to a preferred embodiment of the present invention.

FIG. 11 illustrates the toe portion 400 of the boot. Preferably, the toe portion 400 is constructed with an inner liner 10, followed by a foam material 30, followed by a breathable membrane 60 and finally followed by the outer fabric 70. Foam material 30 can either be a single foam, two foams, a thermolite, a thermolite and foam combination, or any of these in combination with a non-woven top sheet (or a cellular elastomeric composite). Abrasive grip fabric 100 is also shown.

The 6500 high abrasive fabrics manufactured by Schoeller, Inc. or the like are optionally located on the back of the cuff and the top of the toe box and heel. The Kevlar and cordura, starlite fabrics provide comfort and durability to the liners and are extremely strong and resistant to abrasion and allow for breathability and performance.

Figure 12:
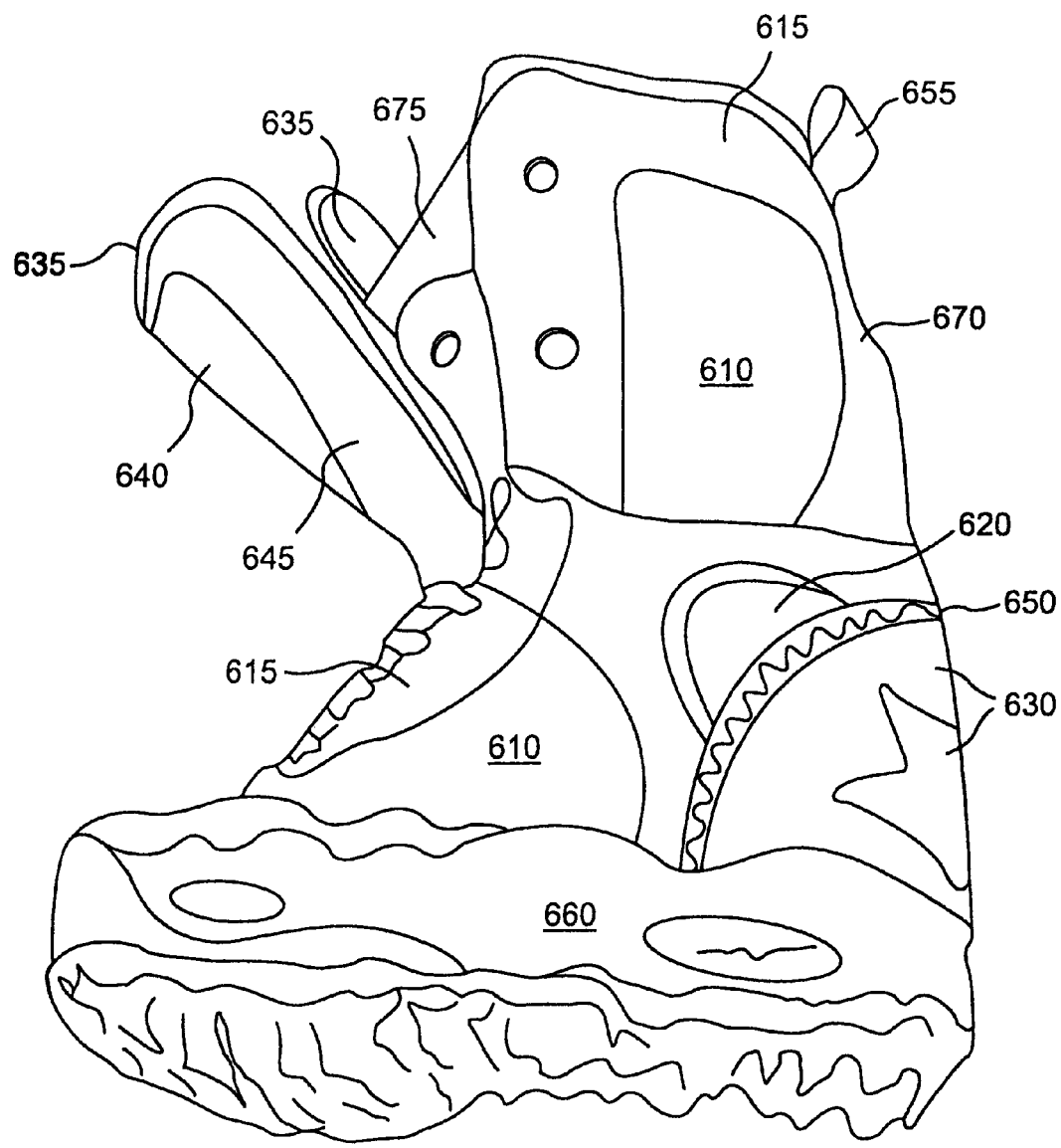
FIG. 12 illustrates an overall drawing of a snowboard boot which will incorporate the liner of the present invention.

FIG. 12 illustrates a snowboard boot incorporating the lining system discussed above. The following elements of the snowboard boot are shown: numeral 610 represents a waterproof breathable synthetic leather, a Kevlar fabric (made by Shoeller, or a similar material), Schoeller, Dupont & Toray or the like, Cordura or DERMIZAX by Toray; numeral 615 represents materials similar to that of numeral 610; numeral 620 is also similar to the materials of numeral 610, but can have different colors for aesthetic purposes; numeral 630 represents a Kevlar or a material made by Schoeller, or the like, with the heel portion being synthetic rubber or the like, manufactured by Daewoo; numeral 635 represents an inner moisture transfer material covering a molded breathable foam; numeral 640 represents a Kevlar or cordura material; numeral 645 is preferably a Kevlar material; numeral 650 represents some decorative piping made of synthetic leather or the like; numeral 655 represents a pull tab made of nylon or synthetic leather; numeral 660 represents the base of the boot which can be made of a synthetic polyurethane; numeral 670 represents a reflective Kevlar back; and finally, numeral 675 represents an optional sock that can be inserted into the boot if desired.

The sock 675 is made up of three layers. The first layer can be any of the inner liner materials discussed above. The second layer is a layer of foam or thermolite or a combination thereof. The third layer is a fabric such as moisture transfer LYCRA® blend manufactured by Deercreek Fabrics, Memra Mills or the like. Encapsulation technology can also be applied to the third layer. Sock 675 can be used for additional warmth and is removable, unlike the boot liner. The three layers can be attached to one another by lamination, although mechanical bonding, or stitching, or ultrasonically bonded, can also be used.

The microfiber technology disclosed above is rapidly developing and changing and has greatly increased the potential for improved performance of such products such as snowboard boots, provided that they are properly utilized as in the present invention. These new products are part of rapidly developing fabric technology. The present invention employs a combination of fabric, foam, moldable spacer materials and thermolite layers with breathable membranes, structurally woven or knitted waterproof fabrics, coated fabrics or encapsulated outer fabrics in such combinations that increase the performance of the products in which they are used as well as increase breathability. The breathable membranes have also only recently developed and are believed to be less than ten years old.

While the discussion above has focused upon snowboard boots, similar applications can be made with alpine or cross country boots, or in-line skates, with slight modifications. For example, in the case of a cross country ski boot, the liner would preferably have a waterproofed outer fabric attached to a synthetic rubber base. Encapsulation technology and membranes such as TX1540, WILCOFLEX DRY combined with the OUTLAST made by Gateway Technologies can be employed. It is preferable to use OUTLAST or Frisby close to the individuals foot in alpine, alpine cross-country, and hiking boots. OUTLAST or Frisby Technologies may also be added to any of the inner lining material listed. Otherwise, the liner could be very similar, although the use of the supportive mesh could be limited to certain areas. Adjustments in the breathable membrane would be made to accommodate winter conditions and cosmetic changes could be applied to the surface areas.

The following is a brief discussion of the variations that are preferably employed for a removable shell liner for alpine boots, alpine cross country boots and hiking boots. Similar names correspond to similar products discussed above and are not described in further detail.

Alpine Boots

First, a liner for alpine boots is similar to in-line skate boots except that Naltex and the like are not necessary although they can be used for high performance boots. This liner would have the following layers of materials (additional drawings for these applications are omitted in order to be concise). The liner will be described in a sequence of layers beginning with the innermost layer. The first layer is selected from a group including antimicrobial, anti-fungal, polypropylene INNOVA or ALPHA; DRI-LEX cambrelle or DRI-LEX Doe skin manufactured by Faytex Corp.; looped poly terry by Kronfli; DRI-LEX/Polyterry by Faytex, polypropylene or wool blends backed by another fiber for example cotton or wool or the like by Coville, Cordora; Polyester sueded or fleeced; Spacer fabrics by Malden Mills; COOL MAX by Dupont; Tietex moisture transfer materials; or Malden Mills polyester and blends thereof, or the like. A combination of these materials may also be employed depending upon the needs of any individual rider.

Just as in the case of the snowboard boot, the various layers can be combined by lamination, mechanical bonding stitch bonding, ultrasonic bonding or a combination of these two. The second and third layers would include a foam that contacts the first layer and is a germicidal, reticulated foam or a hydrofilic, open-cell foam, such as AQUAZONE Foamex or COMFORTEMP by Frisby or the like. Alternatively, these layers can be a cellular elastomeric composite which is one of the above-mentioned foams backed by a non-woven apertured top sheet composed of wood pulp, polyester, rayon, cotton, or polypropylene, in a single process. Adjacent to the inner liner composite foam is a ¼" reticulated layer of AQUAZONE.

The fourth layer is a molded hydrofilic AQUAZONE, slow recovery foam (by Foamex) or flex-guard or a polyester spacer material (by Muller) or the like for support. In this case, AQUAZONE is laminated to a flat non-woven top sheet composed of woodpulp, rayon, cotton, polyester, polypropylene which abuts a waterproof/breathable membrane (fifth layer). If the flex-guard is used it is followed by another layer of AQUAZONE with a top sheet abutting the waterproof/breathable membrane.

If the spacer material is used it may or may not be molded to accommodate the foot. The non-woven top sheet will be eliminated. The spacer material will be followed by either a waterproof membrane, an encapsulated or coated fabric. The spacer material may alternatively be used in a number of the boot layers.

The fifth layer is a waterproof/breathable membrane which may be any one of the following: OUTLAST membrane by Gateway Technologies in combination with Seco-Tex, No. TX-1540 (laminated by Shawmut Mills), THINTEC, VAPEX 2000/1300 standard, LAYTEX and ENTRANT GIL by Toray or the like. The OUTLAST membrane by Gateway Technologies is in conjunction with one of the suggested breathable membrane or the like. The laminated or coated OUTLAST membrane may also be combined with some encapsulated fibers and fabrics. The Frisby Technology may be embedded in the proceed foam or Thermolite or Microloft by Dupont, but is not in combination with a breathable membrane. Frisby Technology can be used in conjunction with structurally knitted waterproof fabrics, or with the encapsulation technology by Nectex, Toray or the like. Encapsulation by Nextec combined with the OUTLAST technologies is preferred. If encapsulation is employed, than the fourth layer preferably includes thermolite. If a non-removable liner is employed instead of a removable liner, a waterproof-breathable thin film can be used instead of encapsulation or a waterproof/breathable membrane.

The sixth and final layer in this removable shell liner may be cordura, starlite, tudor, ¾/ply supplex, Kevlar fabrics, DERMIZAX or encapsulated fabric or any combination of them. Also, a waterproof breathable thin film coated fabric could be used.

Alpine Cross Country Boots

A liner for the alpine cross country boots is similar to the snowboard boot liner except the cross country boot does not having a sock liner and the foams (or thermolite and foam) are thinner. This liner would include the following. A first layer selected from a group including polypropylene, LYCRA® or wool backed by cotton, wool, or a rayon blend or an anti-microbial, anti-fungal INNOVA or ALPHA; sueded polyester; polyester field sensor; looped polyester terry; DRI-LEX doeskin or baby kid by Faytex Corp.; polyester DRI-LEX Terry by Faytex; polyester spacer fabric by Malden; and polypropylene backed by cotton by Coville.

The second layer is a germicidal open cell hydrofilic foam it may be COMFORTEMP by Frisby or AQUAZONE with Frisby Technologies. This foam can be provided with or without a nonwoven top sheet. The nonwoven top sheet can be selected from any of the materials previously specified.

The third layer is a structural support foam or a moldable spacer material surrounding the ankle and heel. The foam may be a moldable hydrofilic AQUAZONE. The heel and arch may also have a slow recovery foam added for comfort. The thickness of the layer of foam or spacer fabric and Thermolite may vary for performance.

The fourth layer is a thin layer of Thermolite, or AQUAZONE or the like with a non-woven top sheet made of wood, pulp, rayon, cotton, polyester or polypropylene. The fourth layer may be optional in some performance categories.

The fifth layer is a waterproof/breathable membrane which may be any one of the following: Seco at Shawmut Mills, THINTEC, VAPEX 2000/1300 standard, LAYTEX, or ENTRANT GIL by Toray. The OUTLAST membrane by Gateway Technologies is employed for this layer. The OUTLAST membrane can be used by itself, with another membrane or with encapsulation technology, such as by Nextec, Toray or the like.

Alternatively, instead of the membrane, just encapsulation of the sixth layer can be performed to achieve similar results. A combination of OUTLAST or Frisby and encapsulation fibers or fabrics by Nextec or the like is preferred. If encapsulation is employed, then the fourth layer preferably includes thermolite.

The sixth layer is one of the following fabrics. Note that if these fabrics are encapsulated, the waterproof/breathable membrane in the fifth layer may not be needed in combination. These fabrics include the following: cordura; LYCRA® blends; starlite by Faytex Corp.; Kevlar fabric by Schoellar (14705, 6500, 13207, 13632, 65563, etc.); Dupont and Toray or the like, Cordura 2000 by Dupont, DERMIZAX and ENTRANT GIL By Toray, 3 or 4 ply supplex; mojave and tudor nylon and polyester blends by Travis; 6 ply maxus nylon blends or the like; and synthetic leathers by Daowoo, Inc. or the like. These fabrics may be used individually or in combination.

The seventh layer is a LYCRA® covered neoprene, moldable slow recovery foam or reticulated open cell foam ankle cuff.

The tongue for the alpine boot is similar to the tongue of in-line skate. The tongue of the cross country boot is similar to the snowboard boot. They can be constructed of AQUAZONE molded foams with a top sheet or moldable spacer fabrics. A slow recovery foam can also be used as specified with the snowboard boot. The inner fabric is one or more of DRI-LEX Areo-spacer, polyester spacer by Malden, polypropylene, polar fleece INNOVA or ALPHA or DRI-LEX doeskin, polyester sueded or fleeced or the like. The outer tongue fabrics are high abrasive fabrics Kevlar, starlite or Schollars corduras, 6500, DRI-LEX Aero-Spacer (or other Aero-spacer materials) by Faytex, or the like, and breathable synthetic leathers by Daewoo, or the like.

Hiking Boots

A liner for the hiking boot would include the following. The first layer is selected from a group including: polyester field sensor; looped poly terry; DRI-LEX by Faytex by Faytex, Doeskin, baby kid, Cambrelle by Faytex; anti-fungal, anti-microbial polypropylene fabrics; INNOVA or ALPHA, sueded polyester blends and COOL MAX, or the like. Any combination of these can also be used.

The second layer is a cellular elastomeric composite or hydrofilic open cell AQUAZONE foam or COMFORTEMP by Frisby. This layer can be combined with the OUTLAST membrane. If a foam is used, a nonwoven top sheet selected from previously mentioned materials can be attached as a backing.

The third layer is a molded hydrofilic AQUAZONE backed by an aperture top sheet composed of cotton, polyester, polypropylene, rayon or woodpulp. A moldable heel and ankle spacer fabric by Muller or the like may also be used in place of the third layer of hydrofilic foam is preferably also used. A moldable slow recovery foam may be added around the toe box and back cuff. A molded heel/ankle insert by Foss is preferably also used.

The fourth layer is a waterproof/breathable membrane which may be any one of the following: OUTLAST membrane by Gateway Technologies combined with Seco-Tex, TX1540 (distributed by Shawmut Mills), THINTEC, VAPEX 2000/1300 standard, LAYTEX®, WILCOFLEX DRY or the like. The OUTLAST membrane may also be used independently of the breathable membrane and may also be coated to the outer fabric. Also, this membrane layer may be eliminated in some models depending upon the hiker's needs. Alternatively, instead of the membrane, encapsulation of the fifth layer can be performed to achieve similar results. If encapsulation is employed, than the third layer is preferably AQUAZONE or a moldable spacer fabric or thermolite. The OUTLAST membrane can be used either with another membrane or in combination with encapsulation, such as by Nextec, or the like.

The fifth and last layer is a combination of one or more of the following: corduras; supplex nylon; starlite; tudor; kevlar; polyester nylon blends; and breathable synthetic leathers. Preferably, this layer is waterproofed by using encapsulation, waterproof films or coatings or breathable membranes, with or without the OUTLAST or Frisby technologies.

Furthermore, the breathable liner according to the present invention could also be added to clothing, such as shirts, pants, etc., by omitting elements such as the structural mesh and by adjusting the number of foam material layers and their thickness. For example, clothing preferably has a wickable inner liner, followed by an 1/16 to 1/8 inch AQUAZONE foam which may be embedded with Frisby Technologies, a nonwoven may or may not be laminated to the foam. A breathable membrane abuts the foam or nonwoven and is laminated to the outer fabric. The outer fabric may be encapsulated, laminated to a breathable waterproof membrane, coated with a waterproof film or structurally woven or knitted to repel water. Indeed the amount of foam used can be reduced due to cost consideration etc. Thermolite or Microft by Dupont may also be added for colder conditions. Also, the breathable membrane may vary depending upon whether the liner will be used in the summer or winter etc. Presently, this liner system is investigating the use of polyester spun bonded filter products by Tangerding Vlitesstoffe, Vitafiber or the like to be used as an alternative to hydrofilic foam layers.

While the present invention has been described above in connection with the preferred embodiments, one of ordinary skill in the art would be enabled by this disclosure to make various modifications to the disclosed embodiments and still be within the scope and spirit of the present invention as recited in the appended claims.

What is claimed:

1. A technical composite or liner, comprising:
   a breathable, moisture transferring fabric;
   a breathable, moisture transfer, germicidal, open cell, moldable foam material; and
   a knitted or woven fabric or a combination thereof,
   wherein at least one of the fabrics or foam material has reversible enhanced thermal properties.

2. The technical composite or liner according to claim 1, wherein the moldable foam material is combined with a second foam material or moldable, breathable, spacer fabric inserted between foam material and the breathable, moisture transferring fabric layer.

3. The technical composite or liner according to claim 1, wherein the moldable foam material is punctured to increase breathability.

4. A technical footwear composite comprising the technical composite or liner according to claim 1, wherein the moldable foam material extends to a heel cup of the technical footwear composite.

5. A technical footwear composite comprising the technical composite or liner according to claim 1, wherein a shaped, breathable, foam material or a moldable, knitted, breathable spacer material is positioned in an liner tongue portion, heel cup portion and toe box portion of the technical footwear composite.

6. The technical composite or liner according to claim 1, wherein the moldable foam material has reversible enhanced thermal properties.

7. The technical composite or liner according to claim 2, wherein the moldable foam material is combined with the moldable, breathable, spacer fabric.

8. The technical composite or liner according to claim 1, wherein the moldable foam material extends to define a toe box.

9. The technical composite or liner according to claim 1, wherein at least one of the fabrics or foam material has reversible enhanced thermal properties by the application of a coating.

10. The technical composite or liner according to claim 1, wherein at least one of the fabrics or foam material is coated or embedded with a thermally regulating material.

11. A technical composite or liner, comprising:
    a first layer of a breathable, moisture transferring fabric;
    a second layer of a breathable, moisture transferring, open cell, foam material; and
    a third layer comprising a knitted or woven fabric or a combination thereof,
    wherein at least one of the layers has reversible enhanced thermal properties.

12. The technical composite or liner according to claim 11, wherein the second layer has reversible enhanced thermal properties.

13. The technical composite or liner according to claim 11, wherein the foam material is combined with a nonwoven material.

14. The technical composite or liner according to claim 13, wherein the nonwoven material has reversible enhanced properties.

15. The technical composite or liner according to claim 11, wherein at least one of the layers has reversible enhanced thermal properties by the application of a coating.

16. The technical composite or liner according to claim 11, wherein at least one of the second and third layers is coated or embedded with a thermally regulating material.

17. A thermally regulating composite material or lining comprising:
    a moisture transfer, breathable material or fabric;
    a nonwoven material; and
    a breathable, moisture transfer material or knitted or woven fabric,
    wherein at least one of the materials or fabrics has reversible enhanced thermal properties.

18. The thermally regulating composite material or lining according to claim 17, wherein one or more of the layers are treated to be water-resistant or waterproof.

19. The thermally regulating composite material or lining according to claim 17, wherein the nonwoven material is attached to a foam material on either side of the nonwoven material.

20. The thermally regulating composite material or lining according to claim 19, wherein the foam material is germicidal.

21. The thermally regulating composite material or lining according to claim 17, wherein the nonwoven material comprises hollow polyester fibers.

22. The thermally regulating composite material or lining according to claim 19, wherein the foam material is mechanically bonded to the nonwoven material.

23. The thermally regulating composite material or lining according to claim 21, wherein the nonwoven material abuts or is combined with a foam material.

24. The thermally regulating composite material or lining according to claim 17, wherein the nonwoven is coated or embedded with a thermally regulating material.

25. The thermally regulating composite material or lining according to claim 17, wherein the thermally regulating composite material or lining is breathable.

26. The thermally regulating composite material or lining according to claim 17, wherein the at least one of the materials or fabrics has reversible enhanced thermal properties by the application of a coating.

27. The thermally regulating composite material or lining according to claim 17, wherein the at least one of the materials or fabrics is coated or embedded with a thermally regulating material.

28. A thermally regulating composite material or lining comprising:
    a moisture transfer, breathable material or fabric;
    a nonwoven material; and
    a breathable foam material,
    wherein at least one of the materials or fabrics has reversible enhanced thermal properties.

29. The thermally regulating composite material or lining according to claim 28, wherein the at least one of the materials or fabrics has reversible enhanced thermal properties by the application of a coating.

30. The thermally regulating composite material or lining according to claim 28, wherein at least one of the materials or fabrics is coated or embedded with a thermally regulating material.

* * * * *